Feb. 5, 1952   J. ALBERTOLI   2,584,526
POSITIONER FOR HEMISPHERICAL FRUIT HALVES
Filed Dec. 3, 1945
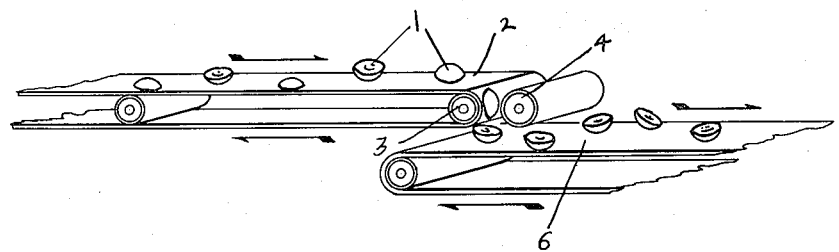
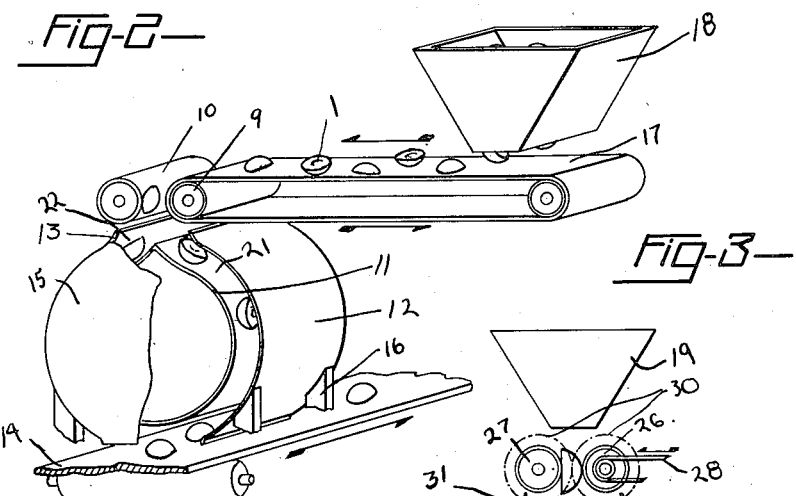
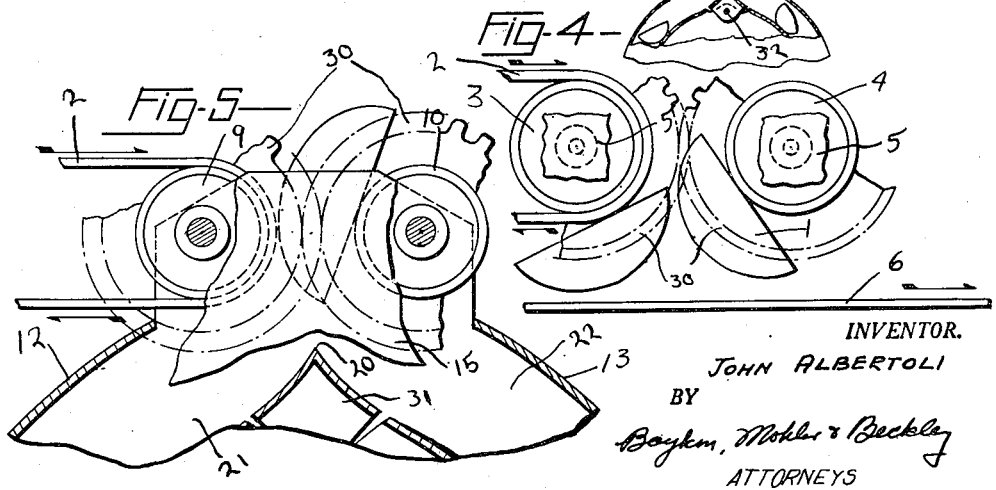
INVENTOR.
JOHN ALBERTOLI
BY
Boykin, Mohler & Beckley
ATTORNEYS Patented Feb. 5, 1952

2,584,526

UNITED STATES PATENT OFFICE 2,584,526

POSITIONER FOR HEMISPHERICAL FRUIT HALVES

John Albertoli, San Francisco, Calif.

Application December 3, 1945, Serial No. 632,477

3 Claims. (Cl. 209—72)

This invention relates to a positioner for hemispherical fruit halves, such as peaches, and the like.

In the canning of peaches, apricots, and the like, the pitting operation generally bisects the fruit, thus forming halves that are generally hemispherical in shape, being flat on one of their sides except for the pit cavities, and convex on the other of their sides.

The hemispherical fruit halves may then be canned or they may pass to slicers, dicers, or the like, for further processing, or they may go to dehydrators. Where the fruit is sliced, the flat sides should be down, but where the fruit is dried the flat sides should be facing upwardly. Other operations may require that the flat sides be down or up according to the particular operation.

Most methods and devices for accomplishing the positioning of the halves either operate through vibrating the halves on specially formed shaker tables, or else the halves are rather severely manipulated. With the tables the volume handled is somewhat restricted unless a relatively large table or tables are used, and with the other devices the fruit is in many instances undesirably injured.

One of the objects of this invention is an improved method of positioning the halves that is fast and not injurious to the fruit.

Another object of the invention is the provision of an improved positioner that is adapted to position the fruit halves rapidly and efficiently and without injury to the fruit.

A still further object of the invention is the provision of improved means for positioning fruit halves with their flat or convex sides facing downwardly as desired, and which means is rapid and reliable in operation and does not injure the fruit.

Another object of the invention is the provision of improved means for positioning fruit halves with their flat sides downwardly, and which means handles the fruit rapidly without injury thereto.

Other objects and advantages will appear in the description and in the drawings.

In the drawings, Fig. 1 is a semi-diagrammatic perspective view of a form of the invention for positioning the halves with their convex sides down.

Fig. 2 is a semi-diagrammatic perspective view of another form of the invention for positioning the halves with their flat sides down.

Fig. 3 is a fragmentary elevational view of a hopper feed for the device of Fig. 2 instead of the belt feed shown in Fig. 2.

Fig. 4 is an enlarged fragmentary sectional view illustrating the spacing between the rollers of Fig. 2 and their relation to the halves and to the receiving conveyor below the rollers.

Fig. 5 is an enlarged fragmentary view showing the relation between the rollers of Fig. 2 with respect to the halves and to each other.

In detail, referring to Figs. 1, 4 the fruit halves 1 may be carried on an endless conveyor belt 2 to between rollers 3, 4 for discharge of the halves to between said rollers. The belt 2 extends over roller 3 and drives said roller so that the side of the latter that faces roller 4 moves downwardly. The roller 4 may be driven in a direction opposite to that of roller 3, or it may be merely an idler roller, as indicated, in which case it will be caused to rotate in a direction opposite to the direction of rotation of roller 3 by engagement with the halves that fall between the rollers.

In using the term "rollers" in the description and claims, it is intended to include rollers in which a belt may extend over one of the pair or in which one of the roller shafts may be driven as seen in Fig. 3. Where the belt is employed it will form the roller surface that is adjacent the other roller that is alongside the same.

The rollers 3, 4 are parallel and are on shafts that in turn are mounted for rotation at their ends in any suitable bearings 5 (Fig. 4).

The spacing between the adjacent surfaces of the rollers is less than the diameters of the fruit halves 1 that are to be fed to between the rollers and greater than their radii. Below the space between said rollers is a carrier 6 that may be a conventional conveyor belt, said belt being preferably positioned a distance below the rollers slightly greater than the radii of the respective halves.

In operation, the halves may be fed directly to the space between the rollers from an overhead hopper, such as indicated in Fig. 3, or as already stated, the halves may be carried by belt 2 to between the rollers. The halves on belt 2 are indiscriminately arranged, but due to the spacing between the rollers 3, 4 they will be compelled to drop edgewise between the rollers.

The halves that have their flat sides against roller 3 (belt surface) will tend to follow the belt around, and will be tilted upon dropping so that their convex sides are lowermost, and their flat sides are directed upwardly. The halves that have their flat sides facing roller 4 will automatically be tilted in the same manner, except that their flat sides will be directed more toward roller 4. Thus the halves will be positioned on conveyor 6 with their flat sides facing upwardly. The conveyor 6 may carry the conventional drying trays, in which case the halves would be correctly positioned and supported for going to a dehydrator or to any point where the further processing required the halves arranged with their cut or flat sides facing upwardly.

This tendency for the halves to automatically fall from between the rollers with their flat sides directed upwardly, is also utilized in arranging the halves with their flat sides facing downwardly, as seen in Figs. 2, 3 and 5.

In Figs. 2, 5 the rollers 9, 10 correspond to the rollers 3, 4 of Fig. 1. However, instead of the halves falling onto a horizontal conveyor as seen in Fig. 1, they are discharged into a pair of generally circularly extending, vertically disposed chutes. Such chutes may comprise a generally cylindrical member 11 positioned so its central axis is parallel with the axes of rollers 9, 10 and in a vertical plane bisecting the space between said rollers. This member 11 forms the inner sides of the chutes that receive the halves.

The outer sides of said chutes comprise generally semi-cylindrical sections 12, 13 that respectively extend over the outer sides of member 11 spaced therefrom. The upper ends of said sections respectively terminate below rollers 9, 10 and their lower ends terminate in spaced relation over a horizontally extending conveyor 14. Ends 15 may close the lateral ends of the space between the member 11 and sections 12, 13, which ends are preferably secured to said sections and member for spacing them apart. Any suitable framework 16 may be used to support the member 11 and sections 12, 13 above conveyor 14, such framework being broken away in Fig. 2 and only partially shown.

A belt 17 corresponding to belt 2 of Fig. 1 may extend over roller 9 for carrying the halves 1 to the two chutes, and a hopper 18 may be positioned over belt 17 for feeding fruit halves thereto, or as seen in Fig. 3, a feed hopper 19 may be positioned directly over the space between the rollers.

The upper side of member 11 is formed with a relatively sharp, upstanding ridge 20 that is parallel with the axis of said member and that is in a vertical plane bisecting the space thereabove between rollers 9, 10. This ridge may be secured onto member 11 or it may be formed in the upper side thereof, and its sides are preferably curved to provide concave surfaces facing rollers 9, 10 respectively so that the spacing between said rollers and said surfaces where the latter continue beyond the upper ends of sections 12, 13 is about the same as between member 11 and said sections.

In operation, the halves 1 will fall edgewise between rollers 9, 10 in the same manner as described with respect to Fig. 1. The flat sides of said halves will be offset to one side or the other of the said vertical plane bisecting the space between rollers 9, 10, therefore the convex lower sides of the halves will engage one or the other of the convex surfaces of the ridge 20 for deflecting the halves into chute 21 or chute 22 that extend from opposite sides of said ridge. Once in either of said chutes the convex sides of the halves 1 will slidably engage the member 11 while the flat sides will face sections 12, 13. However, the halves cannot tumble so as to turn over, because the spacing between the sections and member 11 is less than their diameters. Therefore they will slide down the chutes, and as they pass the half-way point, their flat sides will commence to face downwardly and will slide against sections 12, 13. When the halves reach the lower ends of chutes 21, 22 they will be fully inverted and will slide out generally tangentially of their paths of travel in the chutes onto conveyor belt 14 with their flat sides down. The belt 14 may then carry the halves to the slicers or dicers or to any desired point.

In Fig. 3 a hopper 19 may feed the halves to the space between a pair of rollers 26, 27 in which case one of the rollers, such as roller 26, may be driven by a belt 28 that extends over a pulley on one end of the roller shaft. The turning device below the rollers 26, 27 may be identical with the one shown in Figs. 2, 5.

As seen in Fig. 5, while the roller 9 is power driven directly from belt 2, the two rollers are connected by gears 30 so that both are power driven, and the same is true of the rollers 26, 27 of Fig. 3.

While in most instances the upper portion of member 11 that carries the ridge 20 is rigid with the member 11, there are instances where is is preferable that the same, such as ridge piece 31, be supported for movement, as by coaxial pivots 32 (Fig. 3) which will prevent any of the halves from any possible tendency to jam on the ridge. Sufficient play is allowed for movement of said ridge piece 31.

It is to be understood that the detailed description and drawings are not intended to be restrictive of the invention, but are merely illustrative thereof.

I claim:

1. A positioner for substantially hemispherical fruit halves comprising a pair of horizontally disposed parallel rollers spaced apart a distance less than the diameter of such halves, means for feeding such halves to between said rollers for downward movement generally edgewise with the flat sides of said halves offset to one side or the other of a vertical plane bisecting the space between said rollers, a diverter in said plane disposed below said space for engagement with the convex under surfaces of said halves adjacent their flat sides to deflect the halves to one side or the other of said plane to positions with their flat sides facing upwardly, means for carrying the halves so deflected to a point of discharge, said means comprising a pair of generally semi-circular vertically extending chutes having opposed substantially semi-circular sides for holding said halves from tumbling while so carried and for delivering said halves to the lower ends of said chutes with their flat sides facing downwardly.

2. A positioner for substantially hemispherical fruit halves comprising a pair of horizontally disposed parallel rollers spaced apart a distance less than the diameter of such halves, means for feeding such halves to between said rollers for downward movement generally edgewise with the flat sides of said halves offset to one side or the other of a vertical plane bisecting the space between said rollers, a diverter in said plane disposed below said space for engagement with the convex under surfaces of said halves adjacent their flat sides to deflect the halves to one side or the other of said plane to positions with their flat sides facing upwardly, means for receiving the halves so deflected and for delivering said halves to a discharge point with their flat sides facing downwardly at said point.

3. A positioner for substantially hemispherical fruit halves comprising a pair of horizontally disposed parallel rollers spaced apart a distance greater than the radii of such halves and less than their diameters, means for feeding such halves to between said rollers for downward movement generally edgewise with the flat sides of said halves offset to one side or the other of a vertical plane bisecting the space between said rollers, means for simultaneously driving said rollers for downward movement of their adjacent sides, a diverter in said plane disposed below said space for engagement with the convex under surfaces of said halves adjacent their flat sides to deflect the halves to one side or the other of said plane to positions with their flat sides facing upwardly, means supporting said diverter for slight movement thereof but substantially in said plane, means for receiving the halves so deflected and for delivering said halves to a discharge point with their flat sides facing downwardly at said point.

JOHN ALBERTOLI.

REFERENCES CITED

The following references are of record in the file of this patent:

UNITED STATES PATENTS

| Number | Name | Date |
| --- | --- | --- |
| 1,246,138 | Mitchell | Nov. 13, 1917 |
| 1,669,087 | Hungerford | May 8, 1928 |
| 1,702,901 | Hungerford | Feb. 19, 1929 |